Jan. 19, 1926.
F. J. HEIDEMAN
1,570,144
PRESSURE CONTROLLED TEMPERATURE REGULATOR FOR ARTIFICIAL REFRIGERATORS
Filed Feb. 21, 1923
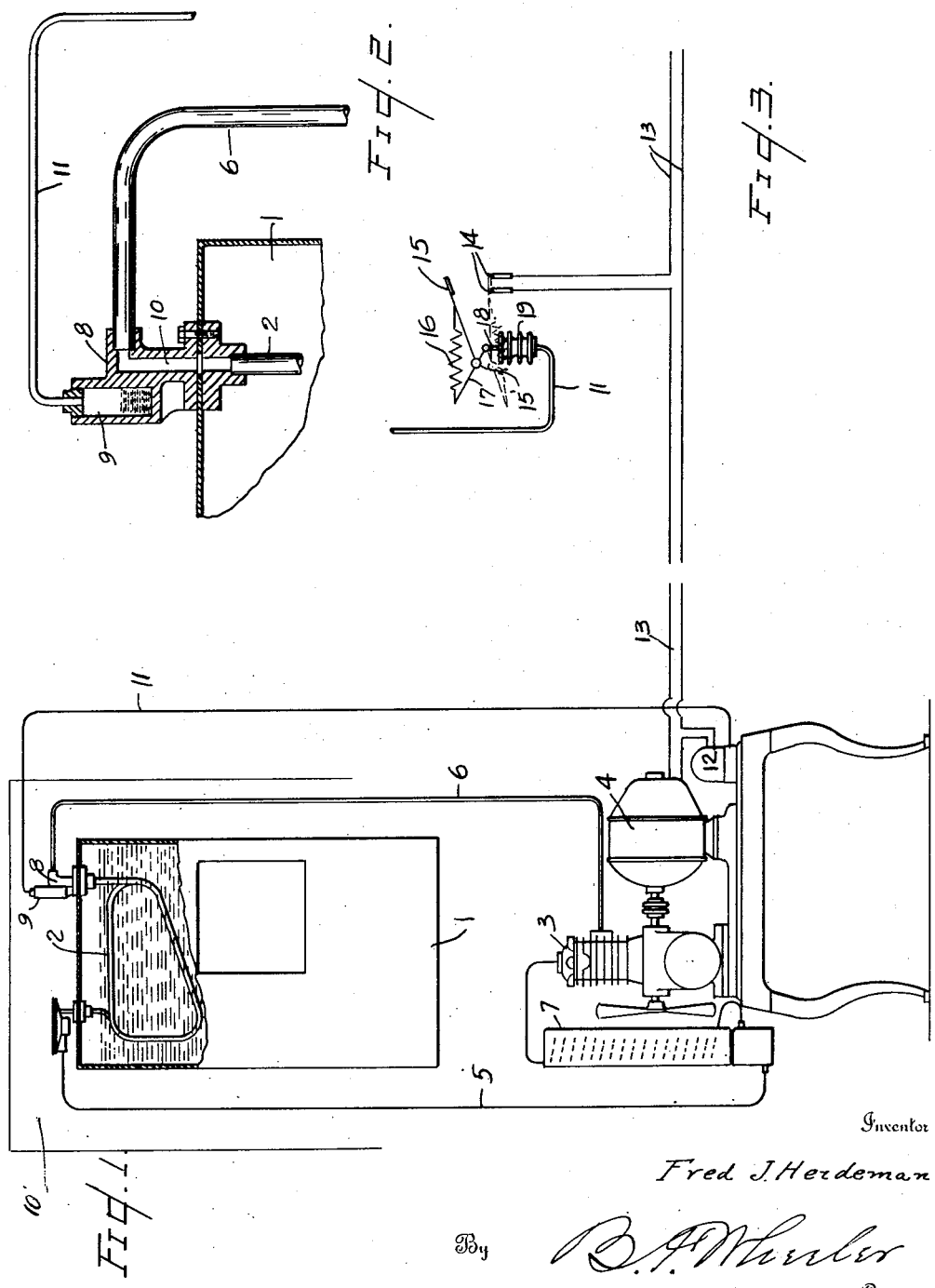
Inventor
Fred J. Heideman
By B. J. Wheeler
Attorney Patented Jan. 19, 1926.

1,570,144

UNITED STATES PATENT OFFICE.

FRED J. HEIDEMAN, OF DETROIT, MICHIGAN, ASSIGNOR TO THE FREEZERATOR COMPANY, OF DETROIT, MICHIGAN, A CORPORATION OF MICHIGAN.

PRESSURE-CONTROLLED TEMPERATURE REGULATOR FOR ARTIFICIAL REFRIGERATORS.

Application filed February 21, 1923. Serial No. 620,548.

*To all whom it may concern:*

Be it known that I, FRED J. HEIDEMAN, a citizen of the United States, residing at Detroit, in the county of Wayne and State of Michigan, have invented a new and useful Pressure-Controlled Temperature Regulator for Artificial Refrigerators, of which the following is a specification.

This invention relates to temperature regulating devices for use in artificial refrigeration.

Heretofore it has been the usual practice to regulate the temperature of a mechanical refrigerated chamber by locating within such chamber a thermostat controlling the circuit supplying electrical energy for maintaining circulation of the refrigerant. Eventually, however, such system of regulation is likely to get out of order for the reason that the low temperature within the refrigerating chamber is productive of condensation tending to corrode such metallic surfaces as collect the condensation. Such corrosion, in the case of the thermostat, which is as a rule a delicate piece of mechanism, interferes with proper movement of the parts and also is detrimental to establishment of good electrical contact through the switch controlled by the thermostat.

It is an object of the present invention to regulate the temperature of a mechanically refrigerated chamber without locating either a thermostat or electrical contacts within such chamber.

It is also an object of the invention to provide a temperature regulating means for the aforesaid purpose that will take effect upon the refrigerant-circulating motor responsive to very slight variations of temperature.

In attaining these objects, the invention contemplates locating within the refrigerated chamber a receptacle containing a quantity of a fluid susceptible to transformation from liquid to gaseous form or vice versa, responsive to slight variations from the temperature which it is desired to maintain in the refrigerated chamber, said receptacle being connected by a pipe or the like with a device located exteriorly of the refrigerating chamber and responding to pressure variations in said pipe to control the refrigerant-circulating motor.

A preferred embodiment of the invention is hereinafter described and illustrated in the accompanying drawing, wherein, Fig. 1 is an elevation in partial section of the brine tank of a mechanical refrigerator, showing also the pumping unit, and diagrammatically showing the connections between said tank and unit.

Fig. 2 is a detail sectional view of a fitting mounted upon the brine tank.

Fig. 3 diagrammatically shows the pressure-responsive device and the switch controlled thereby.

Referring now more particularly to the parts of the invention as designated by the reference characters in the drawing, 1 is a tank and 2 a coil immersed in brine within said tank for cooling said brine upon circulation of a refrigerant through said coil.

The circulating means for the refrigerant is a pump 3 driven by a motor 4, the delivery duct from the pump to the coil being indicated at 5 and the relatively large capacity return duct at 6. In the delivery line, adjacent the pump, a suitable condenser 7 is interposed. 8 designates a fitting through which the return duct 6 is connected to the coil 2, and 9 is a chamber formed in said fitting adjacent the refrigerant passage 10 but having no communication with said passage. Said chamber serves as a receptacle for a quantity of a liquid characterized by a boiling point substantially coinciding with the temperature which it is desired to maintain within the chamber 10' refrigerated by the tank. Among other liquids suitable for the purpose, sulphur dioxide may be mentioned, said liquid being also suitable for use as the circulating refrigerant. The only opening into the receptacle 9 is through a duct 11 connecting with the top of said receptacle and leading to a suitable device 12 which acts responsively to variations of pressure in said duct to control the motor circuit 13. This device is illustrated only diagrammatically since a complete disclosure of said device may be found in applicant's copending application Serial No. 620,547.

Referring to Fig. 3, 14 designates contacts between which the circuit 13 is broken, and 15 a switch arm pivoted at 15' bridging said contacts in one position. 16 is a spring extending between said switch arm and one end of a co-pivotal arm 17, the other end of which is pivoted to a plunger 18 operable by an annularly corrugated expansible, sheet-metal container 19 with which the duct 11 communicates. In either of the limiting positions of the switch arm, shown respectively in full lines and in dash lines in Fig. 3, said spring resists shifting of the arm toward its other limiting position.

In considering the operation of the described invention, it is first to be understood that the liquid in the receptacle 9 will begin to assume a gaseous form as soon as the temperature thereof rises above a definite temperature, this temperature being substantially that which it is desired to maintain in the refrigerated chamber. The gas thus formed enters the duct 11 and thence enters the expansible container 19. Being confined within the small volume of said duct and container the gas quickly acquires a pressure whereby the container is expanded and the plunger 18 raised. A slight upward travel of said plunger effects a shifting of the switch arm to the circuit-closing position shown in dash lines in Fig. 3, the spring 16 now acting to maintain such position. The motor 4 is now energized, the pump 3 is driven, and the refrigerant is circulated through the coil 2. As the brine gives up its heat to the refrigerant, the temperature of the tank 1 and fitting 8 will fall, so that presently the liquid in the receptacle 9 will cease its transformation to gaseous form. Upon a slight further drop in temperature, condensation will occur of the gas in the upper portion of the chamber 9 and in that portion of the duct 11 within the refrigerated chamber. The pressure in said duct and in the expansible container 19 will thus be reduced to an extent permitting the container to contract, either due to the resiliency of its walls or to some external force such as might be applied by a spring (not shown). The lowering of the plunger 18 resulting from such contraction will shift the spring 16 downwardly beyond the pivot 15', causing the switch to snap open. The pumping unit will then remain idle until the temperature within the refrigerated chamber has risen sufficiently to again produce a sufficient gas pressure within the duct 11 and container 19 to again close the switch.

It is an important feature of the invention that the chamber 9 is in close proximity to a passage (10) through which the coil 2 discharges, since, during circulation of the refrigerant, the maximum temperature prevails at the discharge end of the coil so that this end is last to reach a reduction of temperature sufficient to effect condensation within the chamber 9. Thus it is assured that when the energy maintaining circulation of the refrigerant is cut off the brine will be fully cooled to the desired predetermined temperature. Also the cooling influence of the brine upon the contents of the chamber 9 will be prolonged during idle periods of the pumping unit, because of the heat-conducting mounting of said chamber upon the tank 1, so that it is assured that substantially all of the air within the refrigerated chamber will have acquired the maximum temperature limit before the contents of the chamber 9 will arrive at the vaporization point. Thus both the idle and running periods of the pumping unit are prolonged and the number of such periods consequently reduced so as to minimize the energy lost in starting the motor.

What I claim is:

1. In a mechanical refrigerating apparatus, a circulatory system for a refrigerant, said system including an expansion coil, a pumping unit for propelling the refrigerant through said system, an outlet fitting for said coil chambered to form a receptacle for a fluid highly responsive expansively to a temperature increase, a pressure-responsive device exercising control of said pumping unit and a fluid duct connecting said receptacle to said pressure responsive device.

2. In a mechanical refrigerating apparatus, the combination with a refrigerant-circulating system including a pumping unit and having a heat-absorbing portion, and including an outlet fitting for said heat-absorbing portion, chambered to form a receptacle for a fluid highly responsive expansively to a temperature increase, of a pressure-responsive device exercising control of said pumping unit, and a fluid duct connecting said receptacle and pressure-responsive device.

In testimony whereof I sign this specification.

FRED J. HEIDEMAN.